United States Patent
Cahuzac et al.

(10) Patent No.: US 6,843,280 B2
(45) Date of Patent: Jan. 18, 2005

(54) WEAVING DEVICE FOR THE PRODUCTION OF THICK TEXTILE ARMATURES AND ARMATURES THUS OBTAINED

(75) Inventors: Georges Cahuzac, Le Bouscat (FR); Jean-Louis Darrieux, Saint Laurent Medoc (FR)

(73) Assignee: EADS Launch Vehicles, Paris (FR)

( * ) Notice: Subject to any disclaimer, the term of this patent is extended or adjusted under 35 U.S.C. 154(b) by 223 days.

(21) Appl. No.: 10/304,709

(22) Filed: Nov. 27, 2002

(65) Prior Publication Data

US 2003/0140467 A1 Jul. 31, 2003

(30) Foreign Application Priority Data

Nov. 27, 2001 (FR) .............................................. 01 15315

(51) Int. Cl.[7] .............................................. D03D 41/00
(52) U.S. Cl. ........................................ 139/11; 139/1 R
(58) Field of Search .............................. 139/11, 29, 30, 139/34; 156/182, 178; 112/415, 412; 428/102

(56) References Cited

U.S. PATENT DOCUMENTS 5,667,613 A * 9/1997 Fantino et al. .............. 156/182
5,772,821 A * 6/1998 Yasui et al. .................. 156/93

* cited by examiner

Primary Examiner—A. Vanatta
Assistant Examiner—Andrew W. Sutton
(74) Attorney, Agent, or Firm—Young & Thompson

(57) ABSTRACT

A weaving device for the production of thick textile armatures constituted by superposed layers of threads secured together by a binding thread traversing the layers, includes a frame provided laterally and at its periphery with regularly distributed hooking pins, elements for depositing with the aid of the pins, thread and elements for flattening the layers. The pins have a first section with a slight inclination outwardly of the frame and a second straight section prolonging the first and having an a substantially greater inclination outwardly of the frame. The elements for depositing thread include a plurality of guides each supplying a thread, and are moved simultaneously and spaced at an interval equal to n times the interval between pins. The elements for weaving the layers include elements adapted to press the assembly of the layers about their periphery.

11 Claims, 11 Drawing Sheets

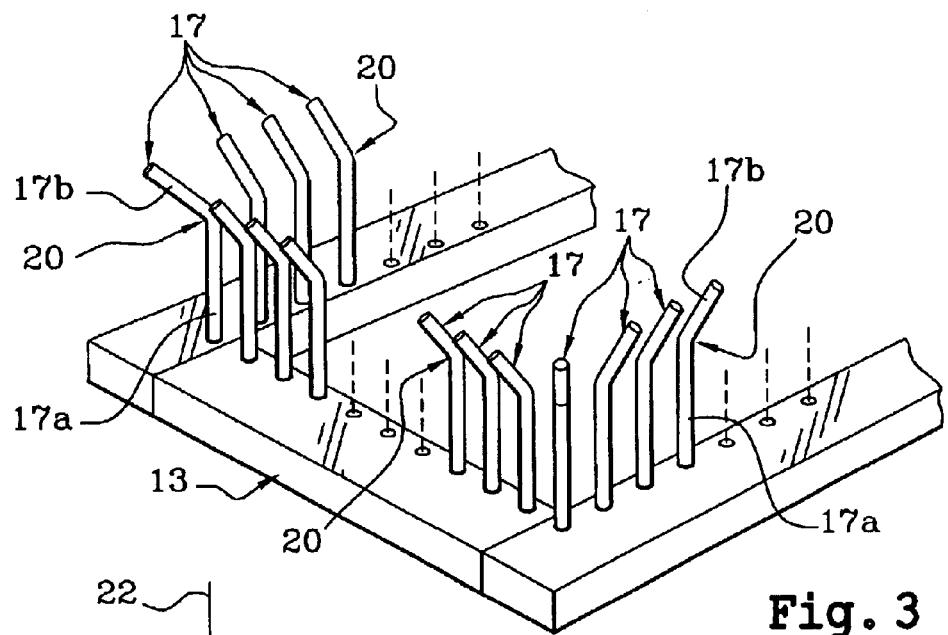
Fig. 3
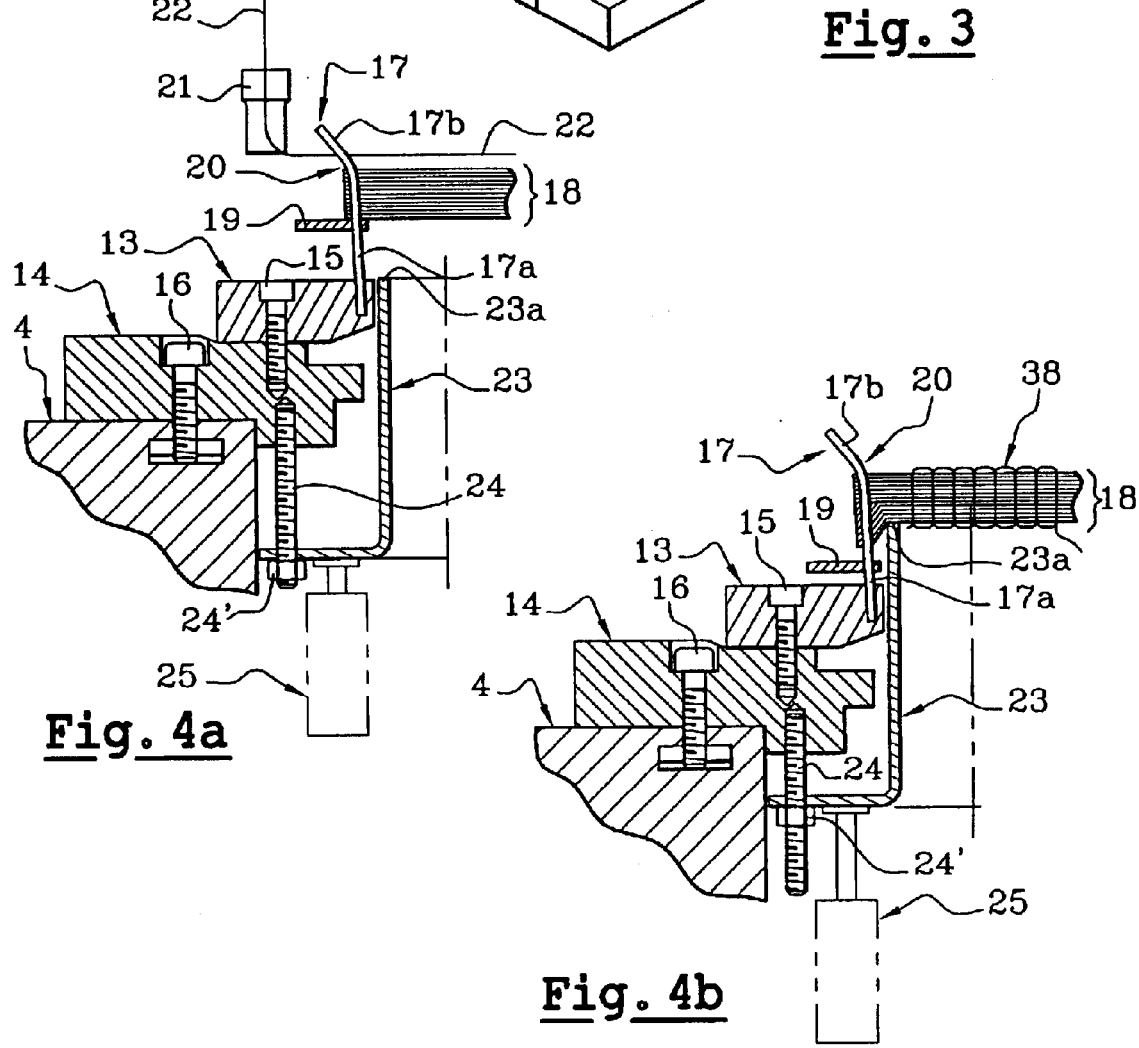
Fig. 4a
Fig. 4b

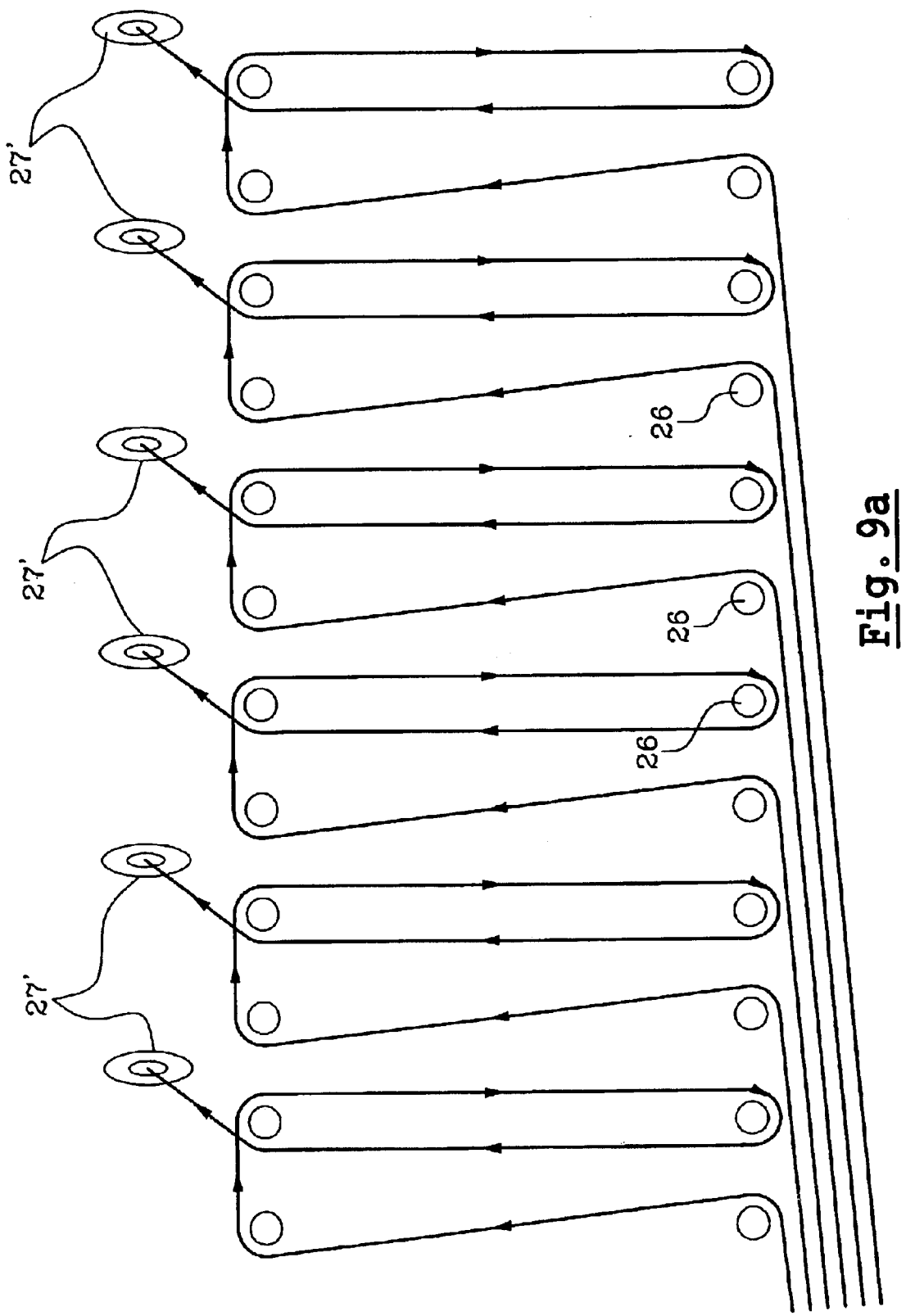

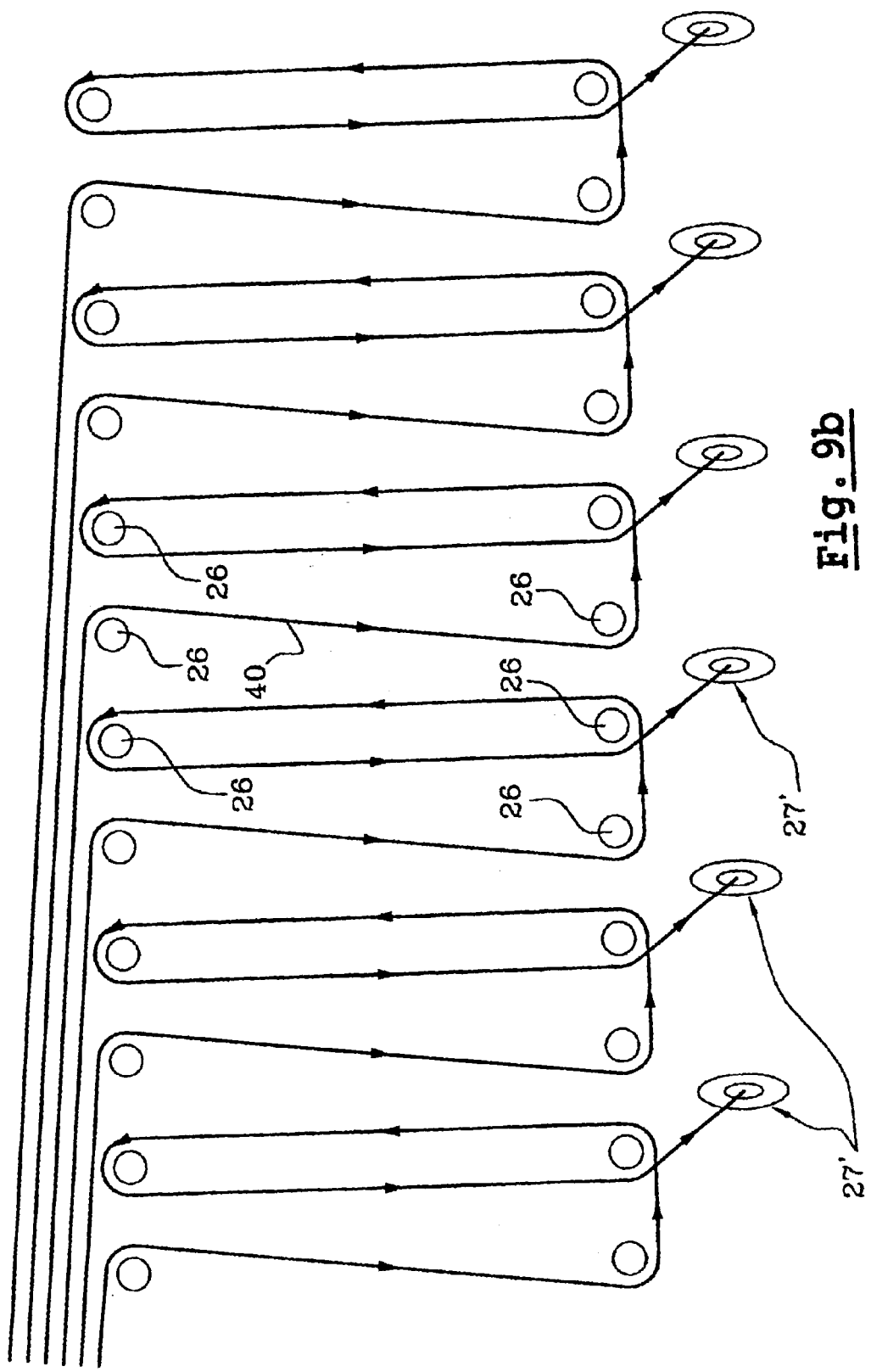

WEAVING DEVICE FOR THE PRODUCTION OF THICK TEXTILE ARMATURES AND ARMATURES THUS OBTAINED

FIELD OF THE INVENTION

The present invention relates to thick textile armatures particularly adapted for the production of composite pieces constituted by such an armature embedded in a hardened matrix.

BACKGROUND OF THE INVENTION

An armature of this type comprises superposed layers of threads, particularly of carbon, glass or boron, generally transversely connected by transverse sewing or through threads.

These armatures are made in two steps. During the first step, so-called weaving, there is produced a superposition of oriented layers, each layer being formed by depositing threads constituting several thousands of threads with the help of guides reciprocating on a frame provided with hooking devices called pins disposed on its periphery.

In the second step, so-called connecting, transverse threads are emplaced by penetration of the stack of layers by one or several needles.

In the patent FR-A-2 718 757 of the applicant, there is described a process and machine for the production of an armature of the above type.

In this patent, there is described a weaving device constituted by a frame surrounding a mass of flexible material and provided with hooking pins implanted about the periphery and one side of the frame.

These pins are simple straight pins disposed parallel to the plane of the frame and at equal distances from each other. The weaving consists, for each layer, in depositing sections of threads parallel to a direction while stretching a thread between two pins on opposite sides of the frame.

The sections of threads being deposited one by one and successively, it will be understood that a substantial amount of time is needed to constitute the desired stack, which can comprise about ten superposed layers. Moreover, it is very delicate to obtain a regular superposition of the layers, particularly at the height of the pins, because the passage of the thread about them while changing direction is not carried out in a superposed manner and with the same spacing. There follow problems of irregularity throughout the mass of the armature which does not have a precise and constant thickness in particular at its periphery.

These problems are not completely corrected by the flattening which is applied after laying down of the successive layers.

Thus, this flattening takes place by a presser plate on the stack of layers, from a single side of the latter because the other side is masked by said mass of flexible material filling the interior of the weaving frame.

It is not possible to maintain such a flattening during the ultimate binding operation because it is necessary to disengage the stack of layers to permit the binding needles to penetrate the fibrous mat thus constituted so as to connect with one thread and without knotting, said layers, the flexible material disposed on the fibrous mat serving to retain transverse binding threads.

The presence of the flexible material on one of the surfaces of the mat in the course of stitching thus ensures a certain tension of the transverse threads contributing with the preliminary flattening to obtaining armatures having a better compactness.

However, optimum compactness is not obtained, because the above flattening is not maintained during stitching and because of resilient reaction the different superposed layers have the tendency, once free from pressing, to space apart, this tendency not being completely counterbalanced by the tension exerted by the transverse threads.

Moreover, the technique set forth in FR-A-2 718 757 is not applicable to binding with knotting, which implies free access to two opposite surfaces of the fibrous mat.

In FR-A-2 730 247, there is disclosed a process for the production of a three-dimensional cloth constituted by superposed fibrous layers interconnected transversely by a connection with knotting, more particularly by a chain stitch.

To this end, there is provided an embodiment for using a weaving device analogous to that of FR-A-2 718 757, with the difference that the interior of the frame is totally disengaged, thereby permitting access to the two opposite surfaces of the fibrous mat.

This weaving device of course has the same drawbacks as to homogeneity and compactness of the armatures thus produced.

SUMMARY OF THE INVENTION

The present invention envisages the production of thick armatures, more particularly of the type with transverse binding by chain stitching, and adapted to have an adjustable compactness that can be optimized.

To this end, the invention has for its object a weaving device for the production of thick textile armatures constituted by superposed layers of threads secured together by a binding thread passing through said layers, said device comprising a frame provided laterally and at its periphery with regularly distributed hooking pins, means for depositing with the help of said pins the thread constituting said layers, and means for weaving said layers, characterized in that said pins are constituted by pins comprising a first straight section extending from the frame and having a slight inclination outwardly of the frame and a second straight section prolonging the first and having an outward inclination from the frame substantially greater than that of the first section, in that said means for depositing thread are constituted by a plurality of guides each supplying a thread, said guides being moved simultaneously and spaced apart by an interval equal to n times the interval between pins, n being a whole number, and in that said means for flattening the layers are constituted by means adapted to press the assembly of said layers about their periphery, adjacent the point of inflection between the two sections of the hooking pins.

According to one embodiment, the inclination of the first sections of the pins is of the order of several degrees, whilst that of the second sections is of the order of 45°.

Such a device permits weaving at a constant height, corresponding to the inflection of the axis of the pins, the thread being disposed at the height of the second section such that by natural descent of the threads along said second sections, the layer in the course of formation will stabilize itself at the height of said inflection, whilst the previously formed layers move along the first section, thanks to its own inclination, thereby to give place to the new layer.

To this natural flattening due to the shape of the pins is added that of said flattening means at the periphery of the mat of layers.

According to a preferred embodiment, said flattening means are constituted by a movable frame disposed on the side of said layers opposite that turned toward said second sections of the pins. Such a weaving frame suitably pressed against the mat of layers over all its periphery, presses the edge of the mat in the direction of the second section of the pins, which blocks because of its inclination the mat and thereby ensures its peripheral pinching. One can similarly not only modulate the flattening and hence the compactness of the mat, but hold this flattening during the ultimate binding operation, thereby truly guaranteeing optimum compaction to the obtained armature, because the holding under pressure of said compressing frame nevertheless leaves substantially totally freed the adjacent surface of the mat.

The pressure of the flattening frame thus moves the stack of layers along the first sections of the pins, in the direction of said inflection points, which slightly tensions the threads of the layers.

BRIEF DESCRIPTION OF THE DRAWING

Other characteristics and advantages will become apparent from the description which follows, of one embodiment of the device of the invention, which description is given by way of example only and with respect to the accompanying drawings, in which:

FIG. 3 is a partial perspective view of a weaving frame according to the invention;

FIG. 4a is a cross-sectional view of a side of the frame of FIG. 3 in place on the machine of FIGS. 1 and 2;

FIG. 4b shows the device of FIG. 4a in the course of binding after weaving;

FIGS. 9a and 9b show a modification of weaving with the help of a weaving head with guides with an enlarged interval;

DETAILED DESCRIPTION OF THE INVENTION

Figure 2:
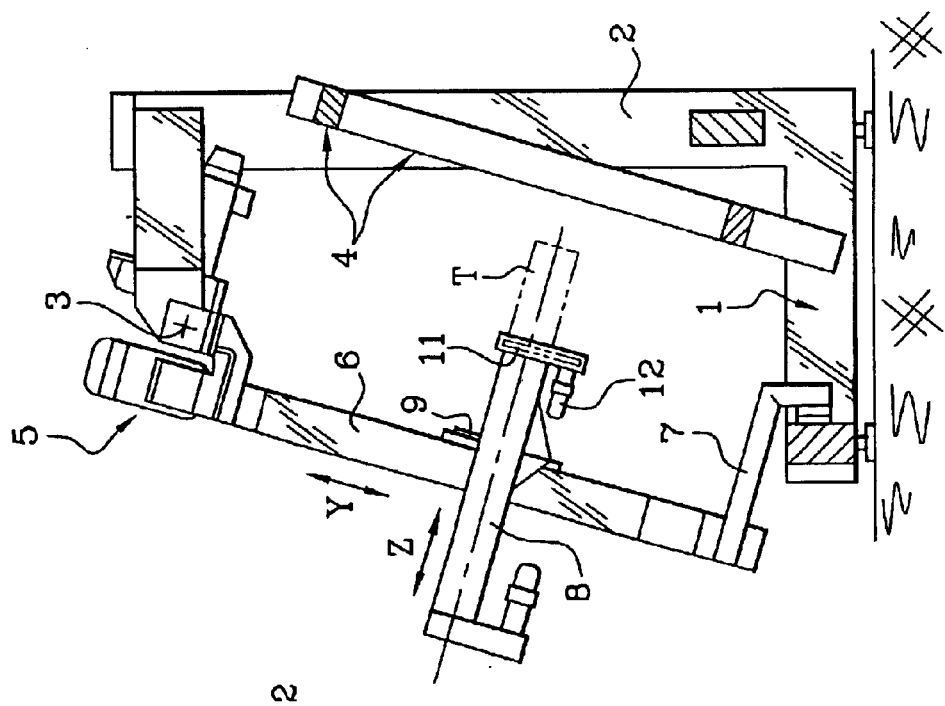
FIG. 2 is a cross-sectional view on the line II—II of the machine of FIG. 1.
Figure 1:
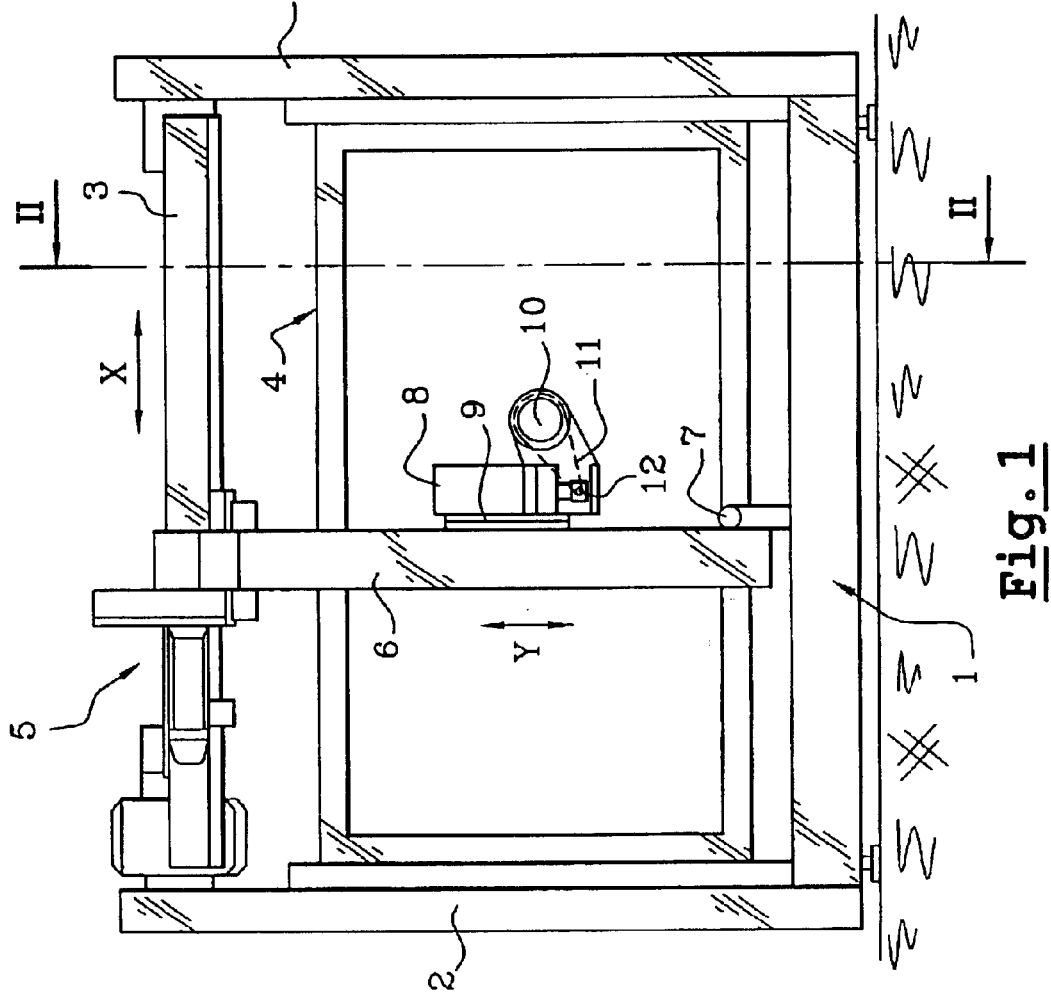
FIG. 1 is a front view of a weaving and binding machine suitable for the production of thick armatures according to the invention.

FIGS. 1 and 2 show a type of weaving-binding machine for the production of thick armatures with superposed layers connected transversely, of known design, permitting working in an inclined working plane to improve the ergonomy and to decrease the factory surface occupied.

The machine comprises a frame provided with a base 1 and vertical uprights 2, connected at their upper ends by a horizontal crosspiece 3, and on which can be fixed at 4 a rectangular frame. The crosspiece 3 defines a first axis X, along which can slide a carriage 5 carrying a bar 6. This latter is perpendicular to the crosspiece 3 and inclined so as to extend parallel to the plane of the frame 4. This bar 6 is secured at its end opposite the crosspiece 3, to the base 1 by means of an elbowed connection bar 7, and defines a second axis Y, orthogonal to X. Moreover, the bar 6 carries, in its turn, an arm 8 that can slide along the latter thanks to a carriage 9 and defining a third axis Z perpendicular to the plane of the frame 4. At its end adjacent the frame 4, the arm 8 carries, laterally offset, a rotatable axle 10 serving as a tool carrier for a tool T (shown schematically in mixed lines in FIG. 2) which can be a weaving head or a stitching head. In this case, the tool T is a weaving head.

Head T is secured to the rotatable axle 10 itself driven in rotation by means of a belt symbolized at 11 and moved by a motor 12.

The frame 4 itself serves as a support for a weaving frame, generally rectangular and which can be of variable dimensions according to the type of piece of composite material incorporating the thick armature to be produced.

In FIGS. 3 and 4a, 4b, there is shown at 13 a rectangular weaving frame according to the invention, mounted removably on the general frame 4 by means of a mounting plate 14 (FIGS. 4a, 4b).

The frame 13 is formed by four disassembleable sides and is fixed by several screws 15 engaged in the rectangular plate 14, itself fixed removably with the help of bolts 16.

Laterally, on one of the surfaces of the frame 13 and adjacent the internal edge, are sunk in the frame a series of hooking pins 17, regularly distributed about all the internal periphery of the frame.

According to the invention, the pins 17 are cylindrical pins each comprising a first straight section 17a extending from the frame and slightly inclined by several degrees in the direction outwardly of the frame, prolonged by a second straight section 17b, also inclined outwardly but at a greater amplitude than the first section 17a. By way of example and preferably, the inclination of the second sections 17b is of the order of 45° relative to the plane of frame 13.

In FIG. 4a, there is shown at 18 a stack or mat of superposed layers of threads woven on the pins 17.

Along the first sections 17a, there can be caused to slide along the four slides of the frame 13 a grill 19 pierced by so-called indexing holes adapted to improve the parallelism and the strength of the pins 17 at the outset of weaving.

At 21 in FIG. 4a is shown schematically a guide for a thread 22 to be woven.

At 23 in FIGS. 4a, 4b is shown a rectangular flattening frame mounted freely slidably along screw-threaded guide pins 24 fixed on the plate 14. A nut 24' screwed on the pins 24 permits blocking the frame 23 in the desired position.

The flattening frame 23 has one wing orthogonal to the plane of frame 13 and whose upper section 23a is adapted, under the action of control jacks 25, to be applied against the facing surface of the mat 18, in line with all its periphery and at a slight distance from the pins 17. The respective out of surface and flattening positions of the frame 23 are shown by FIGS. 4a and 4b.

According to another characteristic of the weaving device according to the invention, the weaving head T preferably comprises several guides 21, moved simultaneously and having each the control of a thread to be woven.

By thread is meant an assembly of several millions of assembled threads, generally dry, but which can if desired be pre-impregnated with a suitable resin. The material of these threads is selected from the group of materials habitually used for the production of textile preforms, such as carbon, glass in the form of rovings, boron, Kevlar, silica, silicon carbide, aramid fibers, etc.

By layer is meant the assembly of threads deposited side by side according to a single layer in a same direction.

Generally, weaving takes place in four directions, namely a weaving at 0° consisting in depositing a layer of threads parallel for example to the large sides of the weaving frame, weaving at 90° of threads parallel to the small sides of the frame and two respective weavings at +45° or −45°, these two weavings being orthogonal to each other.

Most of the time, a thick textile armature for the production of composite pieces comprises layers of threads in four directions: 0°, 90°, +45° and −45°. As a modification and as needed for use, an orientation different from 45° relative to the layers at 0° and 90° could be used.

Figure 5:
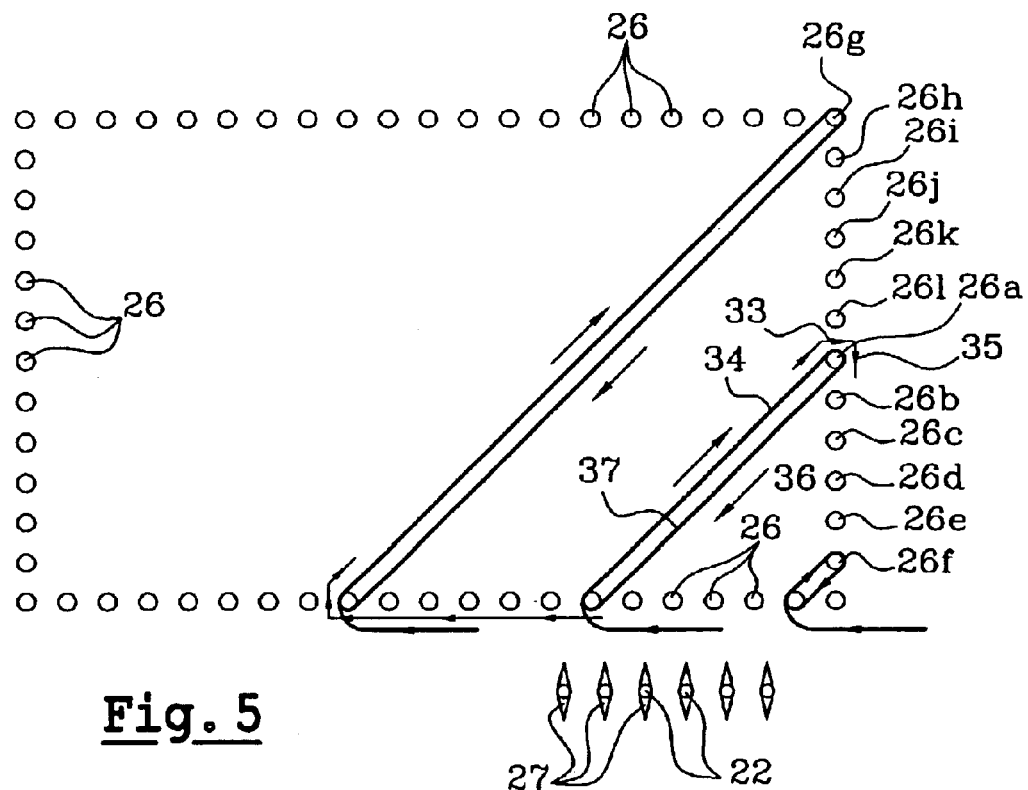
FIG. 5 shows a deposition of the threads of a layer on a frame of the type shown in FIG. 3, with the help of a weaving head with six guides.

In FIG. 5, there is shown the beginning of weaving of a layer at +45° on a rectangular frame of the type of FIG. 3 and in which has been simply represented by the circles 26 the positions of the pins 17.

The weaving thread is for example a carbon thread with 3,000 threads.

In the example shown in FIG. 5, the weaving head T is a multiple head comprising six identical guides 27, aligned, only these latter being shown symbolically in transverse cross-sectional view with their thread 22 to be woven at the interior.

Figure 11:
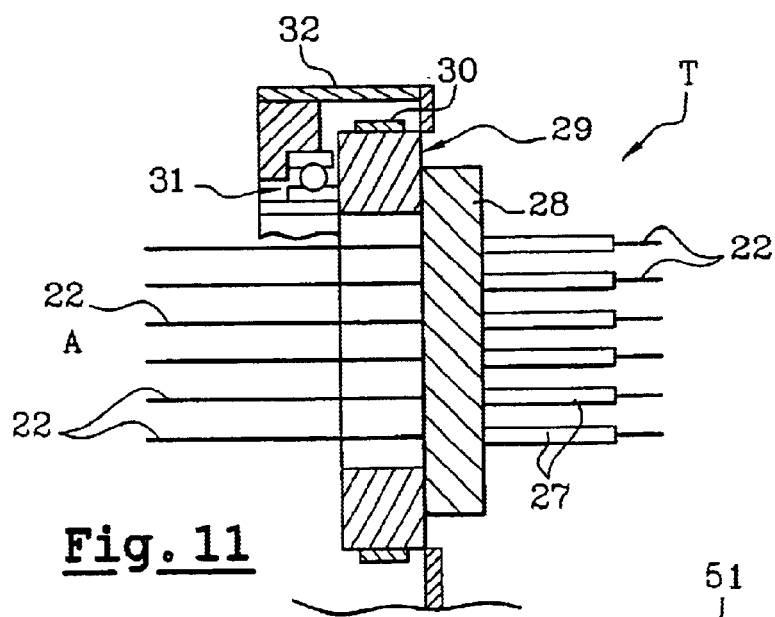
FIG. 11 shows schematically and in perspective a weaving head with six guides.

An example of embodiment of a weaving head T with six guides 27 is shown schematically in FIG. 11.

The guides 27 are of conventional shape, which is to say tubular, hollow and of approximately lozenge cross-section whose large axis is orthogonal to the plane defined by the alignment of the six guides.

The guides 27 are fixed in parallel with constant spacing between them, on a support bar 28, itself fixed on an annular member 29 driven in rotation about its axis by a belt 30 corresponding to the belt 11 of the device of FIGS. 1 and 2.

The rotatable assembly 28–29 is mounted by means of a roller bearing 31 on a fixed frame 32 itself secured to the end of the arm 8.

On the upstream side A of head T, the threads 22 to be woven are supplied in parallel from bobbins disposed on a frame (not shown), via a device for unwinding and supply under regulated tension with picking up a length of thread, in the usual way.

FIG. 5 shows the formation of a layer at +45° by back and forth passes, in the course of each of which simultaneously six threads 22 will be deposited between six pins 26 of the lower longitudinal edge of the frame and six pins 26 of the right side edge, along a path of the guides indicated by the arrows.

The laying down of the threads is shown in greater detail in FIGS. 6a to 6d.

After engaging the threads into the guides 27, and then fixing in the beginning angle of weaving, the guides are, at the outset of the first pass, in the position indicated in FIG. 5, each guide being facing an interval between two pins 26. The guides 27 are moved in the direction of the interior of the frame. Once past the line of pins 26, the guides 27 are moved in oblique translation in the direction of the small right side of the weaving frame. At the end of their path, the head T is pivoted by 90° so as to dispose the guides 27 facing intervals between pins 26a to 26f of said right side.

The guides 27 pass the line of pins 26a to 26f on a trajectory orthogonal to their alignment as indicated by the arrow 33. The guides 27 will then go about the pins 26a to 26f so as to dispose the section of the threads in the direction shown by the section 34 of FIG. 5.

FIGS. 6a to 6d show turning about the pins, according to the invention, this turning about taking place such that the threads 22 (see also FIG. 4a) come into contact with the second section 17b of the pins.

Figure 6A:
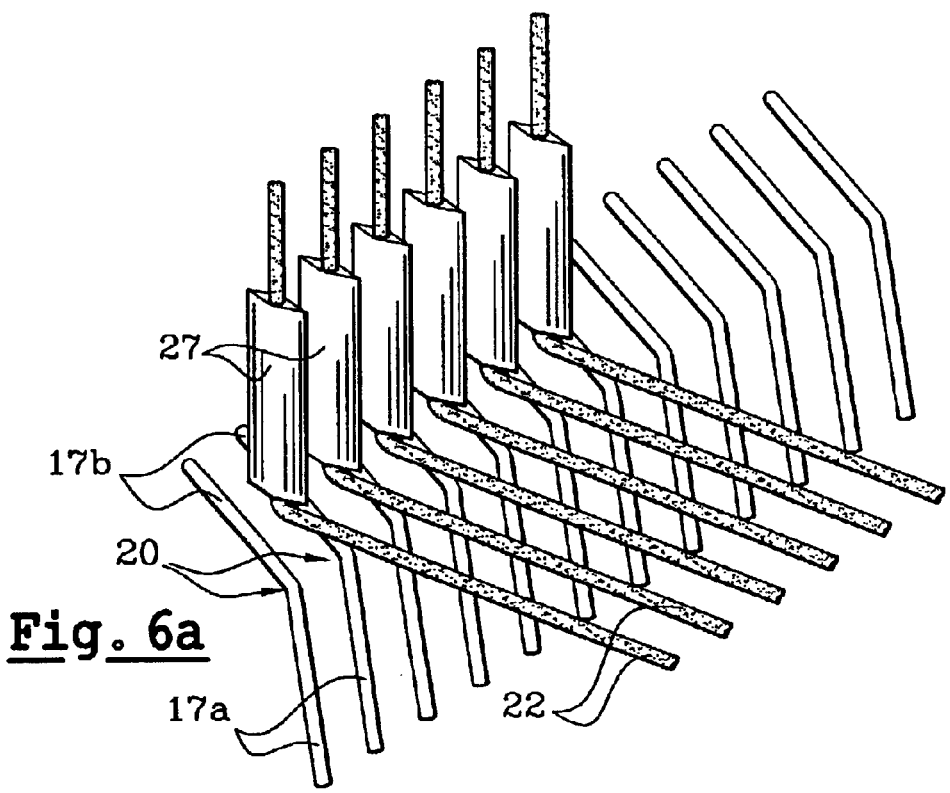
FIGS. 6a to 6d show the path of turning about the hooking pins by the six guides of the weaving head.
Figure 6B:
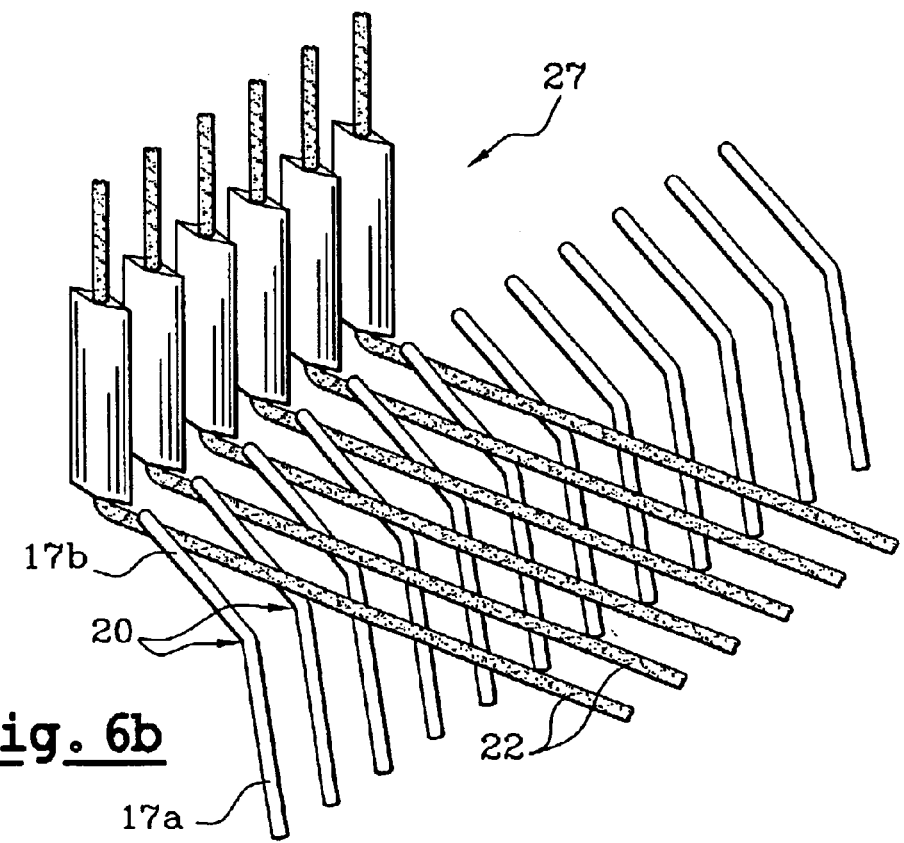
Figure 6C:
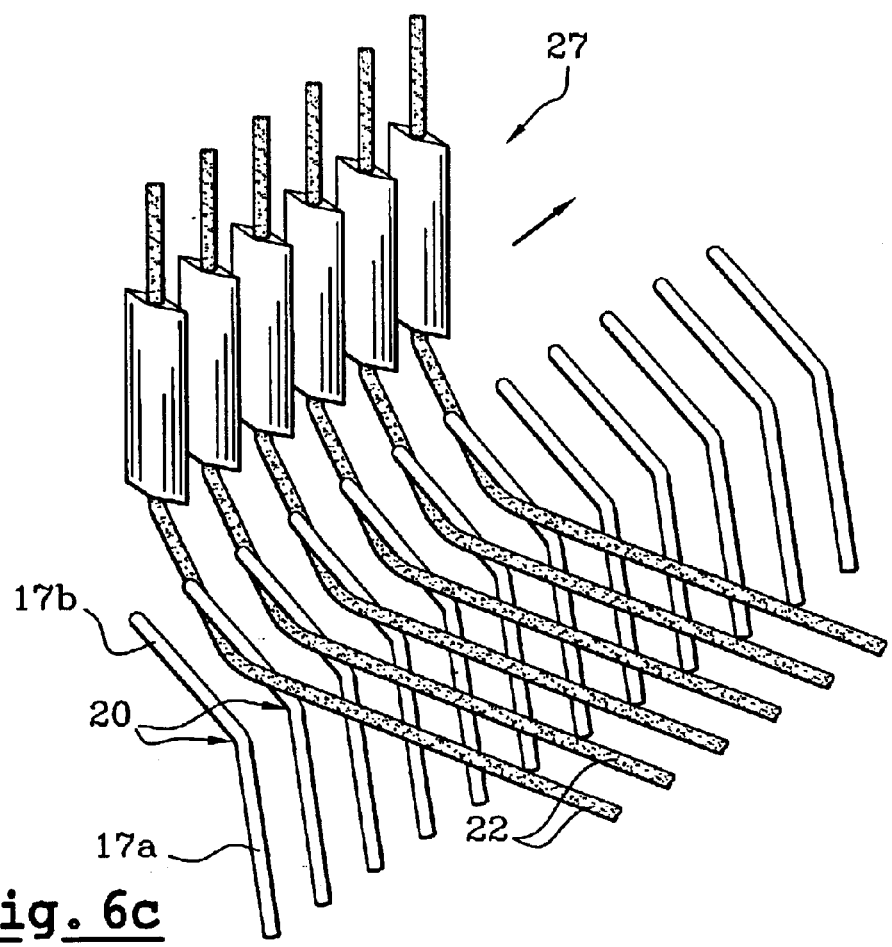
Figure 6D:
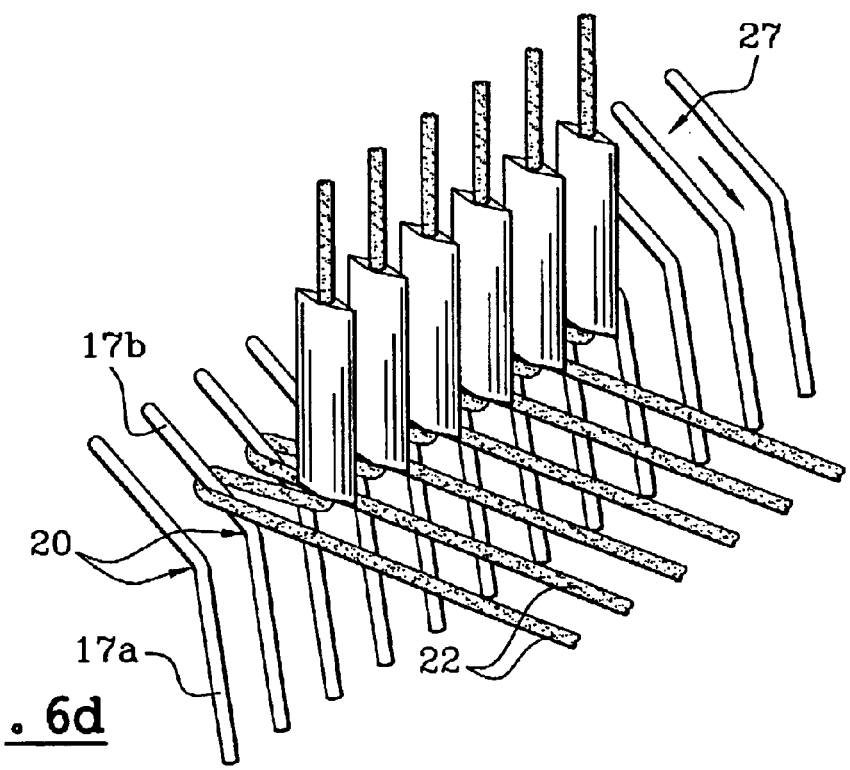

FIGS. 6a and 6d show the movement of the guides 27 according to arrows 35 and 36 respectively of FIG. 5, the orientation of the support bar for the guides not being modified.

In FIG. 6d, the guides 27 begin the laying down of the return threads, such as the thread 37 in FIG. 5, this laying lown taking place by movement of the weaving head facing the six starting pins, analogous to that which took place with respect to the pins 26a to 26f.

The tension exerted on the threads 22 in the course of weaving and their laying down in contact with the inclined section 17b of the pins, naturally results in the threads sliding to the inflection point 20 of the pins.

FIG. 5 shows a second back and forth movement of the weaving head. To this end, the guides 27 which are in the position shown in FIG. 5 are moved in translation parallel to the lower alignment of the pins 26, by a distance corresponding to six intervals between pins. The guides 27 are thus in the starting position for a back and forth movement analogous to the first, which has been described, and involving the pins 26g to 26l on the small straight side of the frame.

Thus, bit by bit and by a certain number of back and forth passes, all the frame will be covered and the +45° layer will be completely formed.

The process of forming layers +45°, 0° and 90° is analogous. For layers at 0° and 90°, the weaving head T need not be pivoted but simply moved in translation in the two directions parallel to the sides of the frame.

In this way there are laid down a suitable number and type of layers, the threads of the different layers being identical or not. Thus could be superposed successively a layer at 0°, a layer at +45°, a layer at −45° and a layer at 90°, this design being then repeated a certain number of times to obtain the desired thickness of the mat 18.

All the layers form at the height of the inflection points 20 of the pins 17.

Each new layer pushes the preceding subjacent layer, this natural flattening taking place by the slight inclination of the first section 17a of the pins, as shown by FIGS. 4a and 4b. In the course of this flattening, the indexing grill 19 slides downwardly by being pushed by the threads.

The movement of the weaving head is automatically program controlled.

Once the mat 18 has been produced, a compacting of the latter, at its periphery, on the side opposite the second section 17b of the pins, is carried out by moving, thanks to the jacks 25, the flattening frame 23 whose upper section 23a compresses the mat 18 as shown in FIG. 4b.

This compacting is maintained in the course of the subsequent operation of transverse binding of the layers of the mat 18, for example by a chain stitch as shown at 38 in FIG. 4b. The extreme peripheral position of the flattening frame 23 relative to the mat 18 permits free access for such connection over both opposite faces of said mat.

The weaving device according to the invention thus permits a very regular and homogeneous distribution of the superposed layers and optimum compaction of the final thick woven structure.

It is also to be noted that at the time of binding, all the threads of the layers are tensioned thanks to the pressing carried out by the frame 23.

FIGS. 6a to 6d and 5 show the production of a standard layer with two threads in each interval between two consecutive pins for all the layers 0°, 90° and ±45°.

As a modification, there can be, for all the layers, particularly at ±45°, deposited a single thread between two consecutive pins.

Figure 7A:
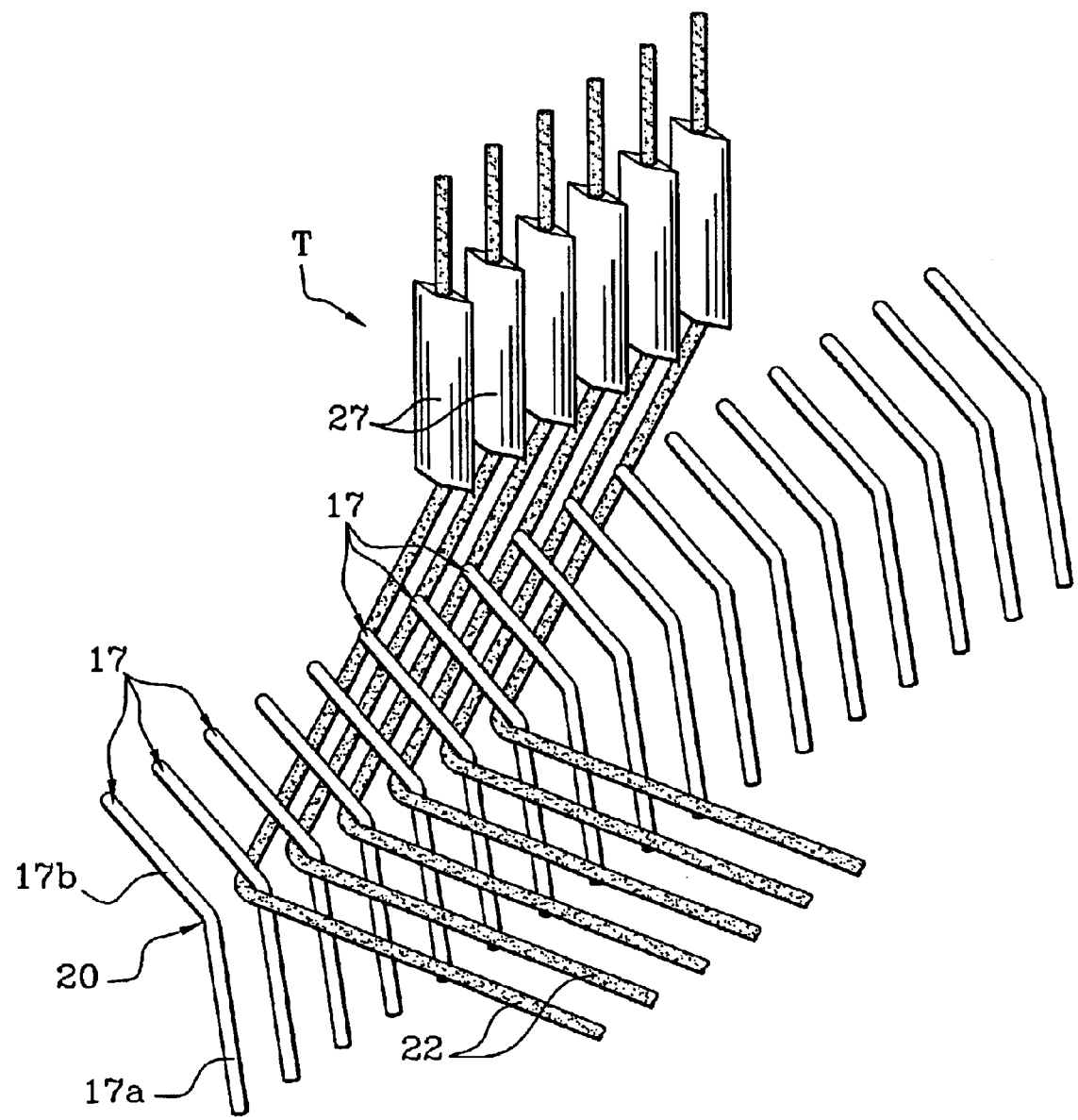
FIGS. 7a and 7b show another way of turning about the pins by the weaving head.
Figure 7B:
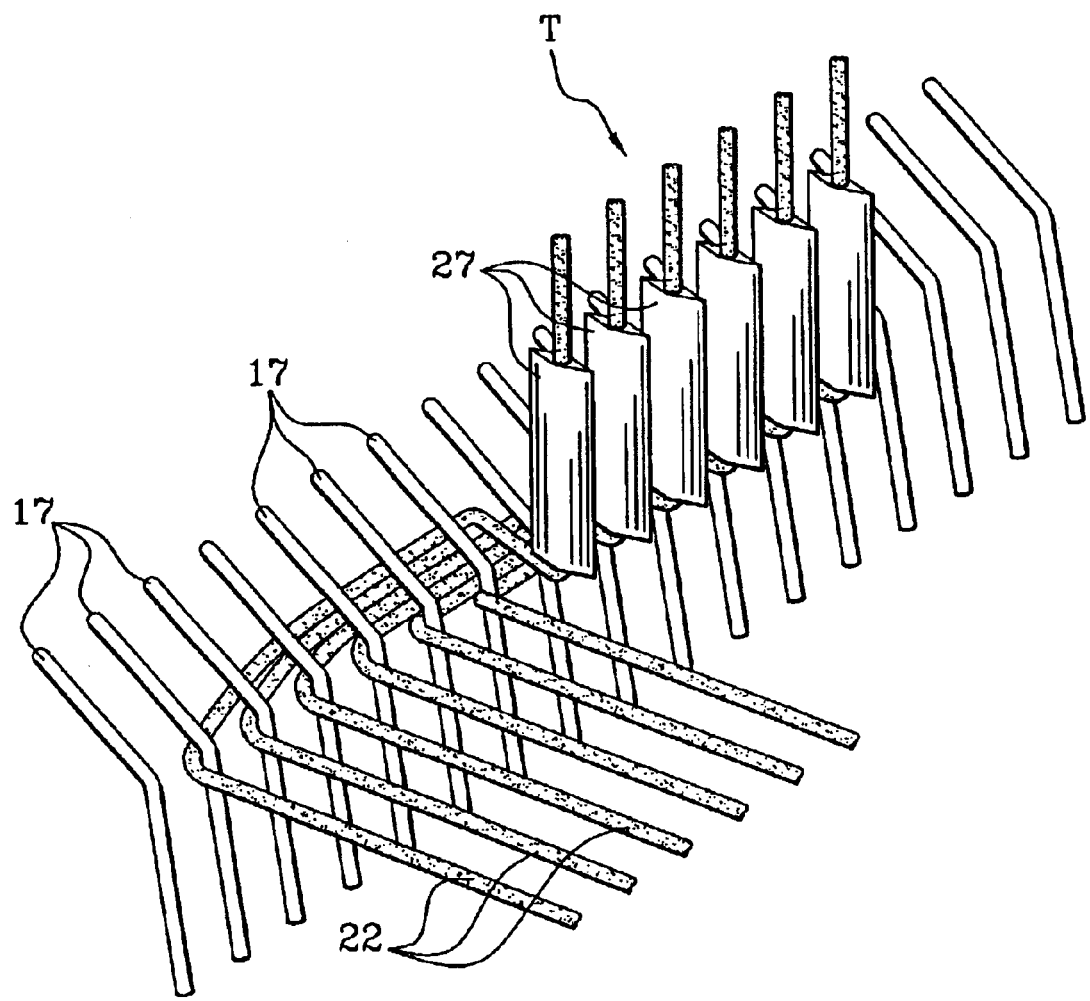

FIGS. 7a and 7b show such a modified weaving with the help of the same weaving head with six guides 27, according to which each thread 22 does not pass about a pin to place itself against the previously laid down thread, but is offset by six pins 17 (FIG. 7b) such that upon return of the guides 27, each thread 22 bears against the adjacent pins. Thus, there is deposited only one thread between two adjacent pins.

This laid down is carried out in FIGS. 7a, 7b with the help of guides 27 with an interval equal to that of the pins 17. The same laid down can be carried out in particular with a thick thread with guides at an interval double that of the guides shown by FIG. 10 described later on.

A laying down of a single thread between pins permits obtaining layers at ±45° that are thinner than the layers at 0° and 90°.

Figure 8:
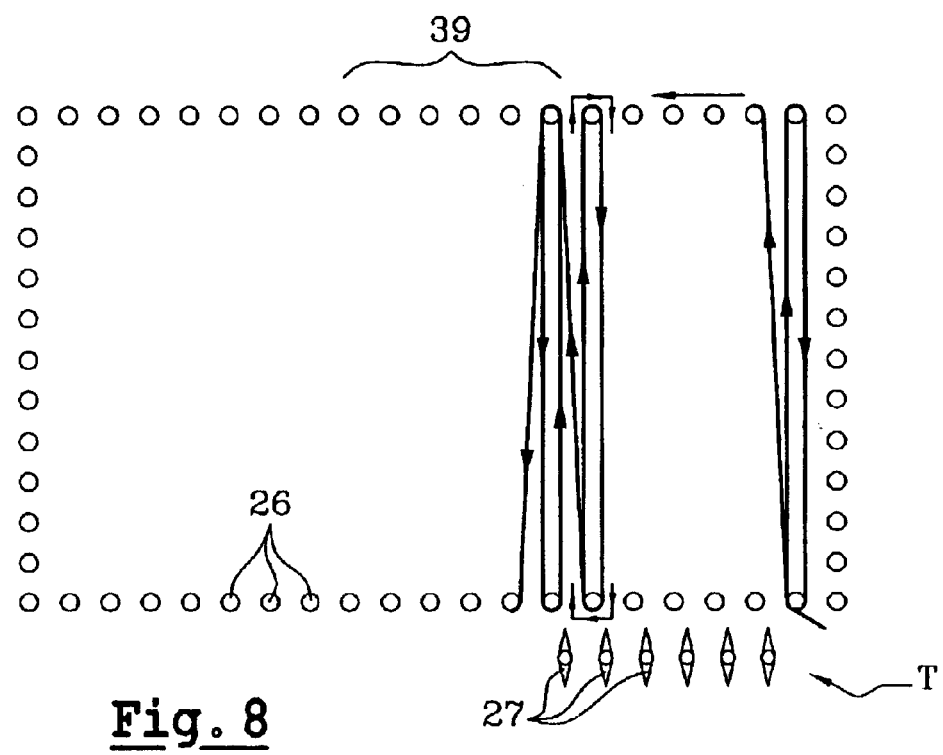
FIG. 8 shows the passage of three threads between two pins with the help of the weaving head of FIG. 5.

FIG. 8 shows the production with the same weaving head T and six guides 27, of a layer at 90° with three threads between two successive pins 26.

To this end, the head T goes back and forth at 90°, and then returns to the starting point, and is offset by one interval (interval between two consecutive pins) to the left. It then carries out a forward movement at 90°, then is offset to the left by six intervals to attack upon the return six new pins referenced 39 in FIG. 8, and so on.

This deposition is suitable for small threads. There can thus be produced a same preform with the layers at 0° and 90° with three threads between two pins (FIG. 8) and layers at ±45° with two threads between two pins (FIG. 5).

FIGS. 9a, 9b show another modified weave with a weaving head according to the invention, with six guides 27' whose spacing or interval is twice that of the pins 26.

FIG. 9a shows the laying down of six threads in line with the first series of twenty-four pins 26, with alternation of one thread between two pins, then two threads in the following interval, whilst FIG. 9b shows the following step of emplacing six threads in line with the following series of twenty-four pins.

For laying down of the sections of threads such as 40, the guides 27' will be offset laterally by one interval of pin in their trajectory between pins 26 on opposite sides.

This modification is suitable for the deposition of large threads.

Figure 10:
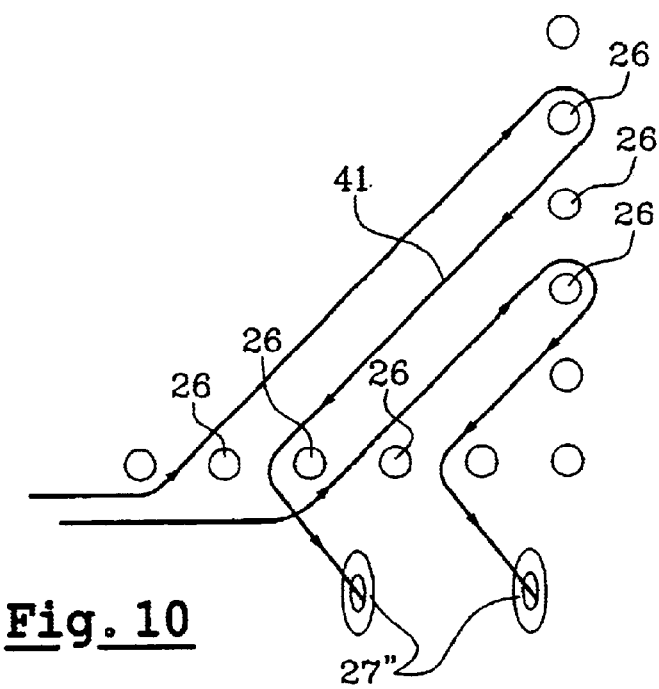
FIG. 10 shows weaving of a large thread with the help of a weaving head with guides and an enlarged interval.

FIG. 10 shows the use of guides 27" of a double interval from that of pins 26 for laying down of large threadss, for example of 12,000 threads, of which only one, 41, is provided between two consecutive pins, to constitute a layer at +45°.

The large thread of the above type can also be emplaced by guides with an interval equal to that of the pins, this latter being greater, for example twice that of the pins adapted for the deposition of small threads. There can thus be produced layers at 0° and 90° with two threads between two consecutive pins, and layers at ±45° with a single thread between two consecutive pins.

With these same guides and pins, there can also be produced layers at 0° and 90° with three threads between two consecutive pins (FIG. 8) and layers at +45° with a single thread between two consecutive pins.

Moreover, it is of course possible to produce textile armatures comprising layers at 0°, 90° and ±45°, of substantially equal thicknesses.

Figure 12:
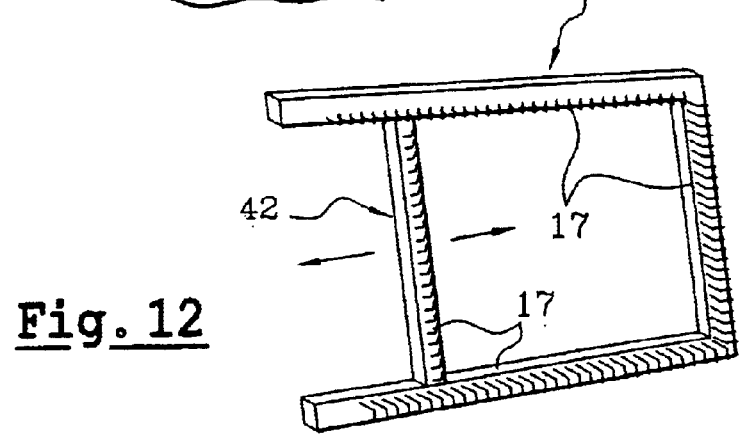
FIG. 12 shows a weaving frame with a sliding bar.

FIG. 12 shows in perspective a frame according to the invention of "variable geometry", namely a frame 51 of which a small side 42 is slidably mounted on the two large sides, which permits changing the dimension of the mat 18 and adapting it to that of composite panels integrating these mats as armatures.

Figure 13:
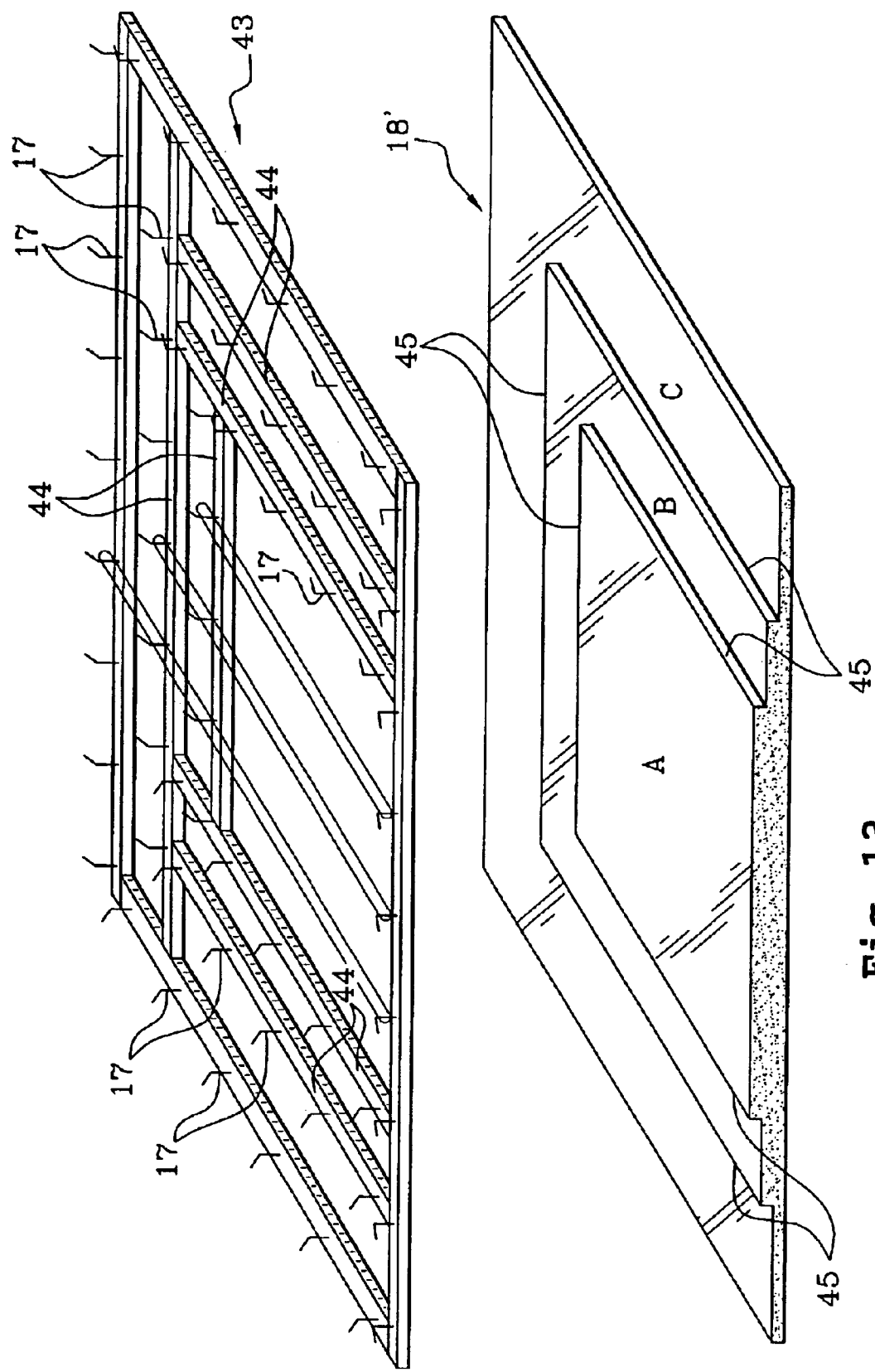
FIG. 13 shows a weaving frame with bars for the production of an armature of variable thickness.

FIG. 13 shows in perspective a weaving frame 43 with multiple fixed bars 44 parallel to the outer sides of the frame. All the elements of the frame 43 are provided with pins 17 of which only several are shown in the figure.

Such a frame 43 permits the production of a mat 18' of which a symbolic illustration is given in FIG. 13 below the frame. The mat 18' has regions A, B, C of different thicknesses delimited by the steps 45 corresponding to said bars 44.

Textile preforms obtained with the weaving means according to the invention are adapted for the production of pieces of conventional composite materials whose matrix is any resin, polyester, epoxid, polyurethane for example, or of high temperature composite material whose matrix is of ceramic or carbon.

Once the woven textile preform is connected, whatever the manner of connection, it remains only to cut it up and place it in the mold.

Withdrawal of the preform from the weaving frame takes place in the usual manner by disassembling the sides of the frame 13 and extracting the assembly of the pins 17 from each side by rotation and retraction of the sides so as to free the preform.

Such a preform can have a thickness reduced to that of two or four superposed layers or on the contrary a greater thickness corresponding to several tens of layers, whose qualities of homogeneity and compactness are remarkable.

The weaving head T with multiples guides permits production of such textile preforms must more rapidly because a plurality of threads are emplaced simultaneously and in parallel on the weaving frame. The number of guides of the head can of course vary according to applications.

What is claimed is:

1. Weaving device for the production of thick textile armatures constituted by superposed layers of threads secured together by a binding thread traversing said layers, said device comprising a frame (13) provided laterally and at its periphery with regularly spaced hooking pins (17), means (21) for depositing, with the aid of said pins, a thread (22) constituting said layers and means for compacting the layers, characterized in that said pins (17) are constituted by pins comprising a first straight section (17a) extending from the frame (13) and having a slight inclination outwardly of the frame and a second straight section (17b) prolonging the first and having an inclination outwardly of the frame substantially greater than that of said first section, in that said means for depositing the thread are constituted by a plurality of guides (27) each guiding a thread (22), guides being moved simultaneously and spaced by flattening an interval equal to n times the interval between pins, n being a whole number, and in that said weaving means of the layers are constituted by means (23 to 25) adapted to press the assembly of said layers about their periphery, adjacent the inflection point (20) between the two sections (17a, 17b) of the hooking pins.

2. Device according to claim 1, characterized in that the inclination of the first sections (17a) of the pins (17) is of the order of several degrees, whilst that of the second sections (17b) is of the order of 45°.

3. Device according to claim 1, characterized in that said flattening means are constituted by a movable frame (23) disposed on the side of said layers opposite that turned toward said second sections (17b) of the pins.

4. Device according to claim 1, characterized in that the interval or spacing between two consecutive weaving guides (27) is equal to the interval between the pins (17).

5. Device according to claim 1, characterized in that the interval or distance between two consecutive weaving guides (27) is equal to twice the interval between the pins (17).

6. Device according to claim 1, characterized in that said first sections (17a) of the pins (17) are provided with an indexing grill (19) adapted to slide along said sections (17a).

7. Device according to claim 1, characterized in that one (42) of the sides of the weaving frame (41) is adjustable in position with respect to the other sides.

8. Device according to claim 1, characterized in that the weaving frame (43) comprises internally fixed bars (44) provided with hooking pins (17) so as to produce textile armatures (18') with zones (A, B, C) of different thicknesses.

9. Thick textile armatures obtained by weaving means according to claim 1.

10. Thick textile armatures according to claim 9, comprising layers at 0° and 90° comprising a number of different threads from that of the threads of the layers at ±45°.

11. Thick textile armatures according to claim 9 comprising layers at 0°, 90° and ±45°, of substantially equal thicknesses.

* * * * *